United States Patent
Matsuda (10) Patent No.: US 7,542,684 B2
(45) Date of Patent: Jun. 2, 2009

(54) LIGHT EMITTING DIODE DRIVING DEVICE AND OPTICAL TRANSMISSION DEVICE INCLUDING THE SAME

(75) Inventor: Hideo Matsuda, Yamatotakada (JP)

(73) Assignee: Sharp Kabushiki Kaisha, Osaka (JP)

( * ) Notice: Subject to any disclaimer, the term of this patent is extended or adjusted under 35 U.S.C. 154(b) by 570 days.

(21) Appl. No.: 11/259,134

(22) Filed: Oct. 27, 2005

(65) Prior Publication Data
US 2006/0092099 A1   May 4, 2006

(30) Foreign Application Priority Data
Oct. 28, 2004   (JP) ............... 2004-314341

(51) Int. Cl.
*H04B 10/04* (2006.01)
*H04B 10/12* (2006.01)
*H01S 3/00* (2006.01)

(52) U.S. Cl. ............... 398/189; 398/186; 398/191; 372/38.02; 372/38.07

(58) Field of Classification Search .......... 398/186, 398/189, 191; 327/109, 514; 372/38.02, 372/38.07
See application file for complete search history.

(56) References Cited

U.S. PATENT DOCUMENTS

| | | | | |
|---|---|---|---|---|
| 4,571,506 A | * | 2/1986 | Lisco ............. | 327/109 |
| 6,476,954 B1 | | 11/2002 | Nishizono | |
| 2001/0043093 A1 | | 11/2001 | Sakura et al. | |
| 2002/0036630 A1 | * | 3/2002 | Sakura et al. ........... | 345/204 |
| 2002/0105982 A1 | | 8/2002 | Chin et al. | |
| 2004/0095184 A1 | * | 5/2004 | Oka et al. ............... | 327/478 |
| 2005/0168419 A1 | * | 8/2005 | Shimizu ............... | 345/82 |
| 2005/0218835 A1 | * | 10/2005 | Suzunaga et al. ........ | 315/291 |

FOREIGN PATENT DOCUMENTS

| | | |
|---|---|---|
| JP | 2001-326569 A | 11/2001 |
| JP | 2002-101047 A | 4/2002 |
| TW | 483203 B | 4/2002 |
| TW | 200301881 A | 7/2003 |

* cited by examiner

*Primary Examiner*—Nathan M Curs
(74) *Attorney, Agent, or Firm*—Birch, Stewart, Kolasch & Birch, LLP (57) ABSTRACT

A light emitting diode driving device for driving an LED includes (i) a driving pulse current generating circuit for generating a driving current for the LED in accordance with a driving pulse signal supplied from outside and (ii) a differentiating circuit for generating a peaking current obtained by differentiating the driving pulse signal. A current that is equal to the sum of the driving current and the peaking current flows to the LED. The light emitting diode driving device further includes a peaking control circuit for controlling the magnitude of the peaking current generated from the differentiating circuit.

12 Claims, 9 Drawing Sheets

FIG. 4 (a)
PEAKING CONTROL ELEMENT IS NOT PROVIDED

FIG. 4 (b)
PEAKING CONTROL ELEMENT IS PROVIDED

Vref: Tr GATE VOLTAGE
Vth: CONTROL ELEMENT
　　　Tr THRESHOLD VOLTAGE

FIG. 5

SMALL DRIVING CURRENT

FIG. 6 (a)
WHEN PHASE COMPENSATION IS NOT CARRIED OUT

Idriv

Ipeak1

Ipeak2

Iled

LIGHT OUTPUT WAVEFORM W2

FIG. 6 (b)
WHEN PHASE COMPENSATION IS CARRIED OUT

Idriv

Ipeak1

Ipeak2

Iled

LIGHT OUTPUT WAVEFORM W3

CONVENTIONAL ART

MEDIUM DRIVING CURRENT

LIGHT OUTPUT
WAVEFORM W4

CONVENTIONAL ART
FIG. 10 (b)

SMALL DRIVING CURRENT

LIGHT OUTPUT
WAVEFORM W5

LIGHT EMITTING DIODE DRIVING DEVICE AND OPTICAL TRANSMISSION DEVICE INCLUDING THE SAME

This Nonprovisional application claims priority under 35 U.S.C. § 119(a) on Patent Application No. 314341/2004 filed in Japan on Oct. 28, 2004, the entire contents of which are hereby incorporated by reference.

FIELD OF THE INVENTION

The present invention relates to a light emitting diode driving device and an optical transmission device including the light emitting diode, and is effective for a signal transmission using light in a wide range of operating temperatures.

BACKGROUND OF THE INVENTION

An optical communication of digital signals is widely used in recent years, and a light emitting diode (hereinafter referred to as an "LED") and a semiconductor laser are widely used as a light source. The semiconductor laser can carry out high-speed driving easily, but becomes unstable depending on temperatures. Therefore, in order to stabilize thermal operations, various devisals become necessary and a circuit configuration becomes complicated. Meanwhile, by using the LED, it is possible to realize the optical communication with a simple circuit configuration at low cost.

Incidentally, the optical communication is widely used for an in-car device in recent years, so that a wider range of operating temperatures has been required. A comparatively cheap plastic fiber is used for such optical communication. The transmittance of the plastic fiber becomes substantially maximal at wavelengths of 650 nm and 570 nm. A red LED is used, not an infrared emitting diode. That is, the transmittance of a quartz fiber is high at the wavelength of 1300 nm that is the wavelength of the infrared, and the quartz fiber is used for a high-speed communication. However, the quartz fiber is weak in bending, needs to be handled carefully, and is expensive. Meanwhile, as compared with the quartz fiber, the plastic fiber is more inexpensive and stronger in bending although the plastic fiber is lower in a decay rate. Therefore, the plastic fiber is used not for long-distance communication but for communication of several tens of meters. Moreover, due to a material characteristic of the plastic fiber, the transmittance of the plastic fiber becomes peak at the wavelength of 650 nm that is the wavelength of the red LED. Therefore, the plastic fiber has been generally used for the optical communication of digital audios, etc.

The following explains a method and circuit for satisfying demands of stabilizing the thermal operations and widening the range of operation temperatures.

Figure 9:
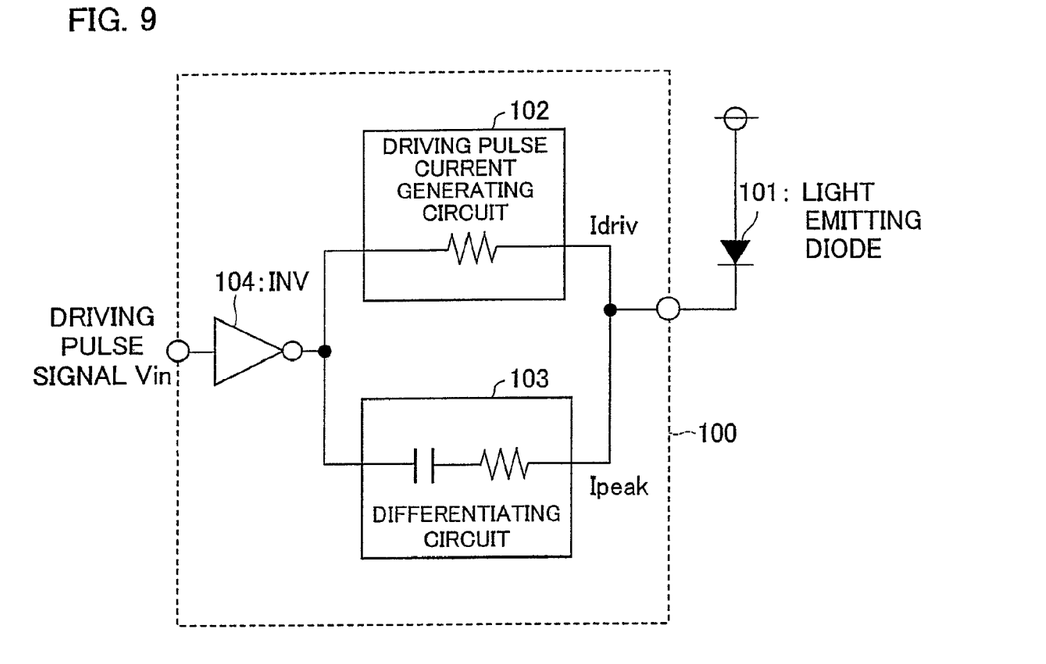
FIG. 9 is a block diagram showing an equivalent circuit of a conventional light emitting diode driving device.

As shown in FIG. 9, a conventional, basic LED driving circuit 100 for driving an LED 101 includes (i) a driving pulse current generating circuit 102 for generating a driving current Idriv for the LED 101 in accordance with a driving pulse signal Vin supplied from outside and (ii) a differentiating circuit 103 that is a peaking current generating circuit for generating a peaking current Ipeak obtained by differentiating a driving pulse signal Vin. The driving pulse signal Vin is supplied to the driving pulse current generating circuit 102 and the differentiating circuit 103 through an inverter 104. Then, a current Iled that is equal to the sum of the driving current Idriv and the peaking current Ipeak flows to the LED 101.

Figure 10:
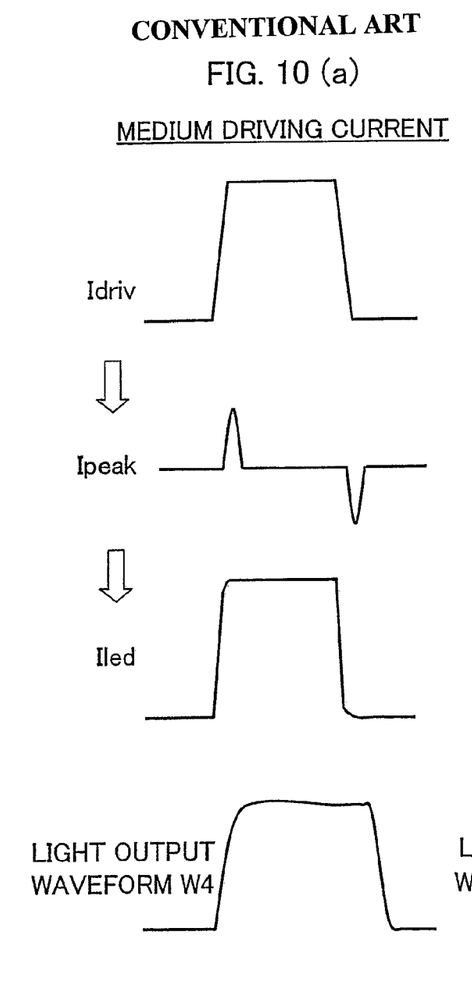
FIG. 10(a) is a waveform chart showing the driving current Idriv, the peaking current Ipeak, the LED current Iled and the light output waveform of the LED in the case in which the driving current is medium in the light emitting diode driving device.
FIG. 10(b) is a waveform chart showing the driving current Idriv, the peaking current-Ipeak, the LED current Iled and the light output waveform of the LED in the case in which the driving current is small in the light emitting diode driving device.

Incidentally, in the LED driving circuit 100, in the case of driving the LED 101 by the driving pulse current generating circuit 102 in accordance with the driving pulse signal Vin supplied from outside, a parasitic capacitor is provided between an anode and a cathode (not shown) of the LED 101 in a parallel manner. On this account, in the case of carrying out the high-speed driving of the LED 101, it is impossible to ignore a time it takes to charge and discharge the electric charge to and from the parasitic capacitor. Therefore, as shown in FIGS. 10(a) and 10(b), time delay occurs at rising and falling of a light pulse waveform. There are such problems, and in the case of using the LED 101, only a light pulse output depending on a specific response speed of the LED 101 can be obtained.

However, there are various proposals to carry out the high-speed driving whose speed is faster than the response speed of the LED 101. Among the proposals, there are, for example, a method called an overshoot method and a method called a backshoot method. The overshoot method is a method for reducing a rise time by adding the peaking current Ipeak and the driving current Idriv to quickly charge the electric charge to the parasitic capacitor of the LED 101. Meanwhile, the backshoot method is a method for reducing a fall time by applying a reverse bias to the LED 101 to quickly discharge the electric charge from the parasitic capacitor when the LED 101 does not emit light. Note that other examples of the LED driving circuit are disclosed in Japanese Unexamined Patent Publication No. 326569/2001 (Tokukai 2001-326569, published on Nov. 22, 2001), Japanese Unexamined Patent Publication No. 101047/2002 (Tokukai 2002-101047, published on Apr. 5, 2002), etc.

Figure 11:
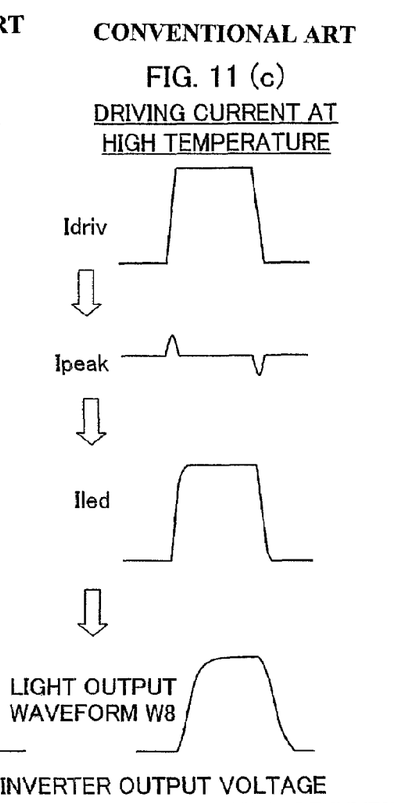
FIG. 11(a) is a waveform chart showing the driving current Idriv, the peaking current Ipeak, the LED current Iled and the light output waveform of the LED in the light emitting diode driving device at normal temperature.
FIG. 11(b) is a waveform chart showing the driving current Idriv, the peaking current Ipeak, the LED current Iled and the light output waveform of the LED in the light emitting diode driving device at low temperature.
FIG. 11(c) is a waveform chart showing the driving current Idriv, the peaking current Ipeak, the LED current Iled and the light output waveform of the LED in the light emitting diode driving device at high temperature.

Incidentally, as shown in FIGS. 11(a), 11(b) and 11(c), in the conventional method for carrying out the high-speed driving of the LED, the amount of the peaking current Ipeak changes in accordance with a temperature change. The peaking current Ipeak decreases at high temperature, while the peaking current Ipeak increases at low temperature. The peaking current Ipeak changes because an output ON resistance of the inverter 104 increases at high temperature while it decreases at low temperature. Therefore, there are problems in that, as shown in FIG. 11(c), an adequately fast response cannot be obtained because the peaking current Ipeak becomes inadequate at high temperature.

Moreover, as shown in FIG. 11(b), the peaking current Ipeak becomes excess at low temperature, so that an overshoot is generated in a light output waveform.

Moreover, light outputs have respective temperature characteristics depending on the structure of the LED 101. Generally, the efficiency of light emission decreases at high temperature. On this account, it is necessary to obtain a constant light output by increasing the driving current Idriv. As with the above, the method used here is a method of superimposing the peaking current Ipeak on the driving current Idriv. Therefore, in the case of largely increasing the driving current Idriv, it is necessary to proportionally increase the peaking current Ipeak. However, the conventional method cannot arbitrarily adjust the peaking current Ipeak in proportion to the driving current Idriv. On this account, when the driving current Idriv is changed, the peaking current Ipeak becomes short or excess, and the light output waveform becomes a light output waveform W5 shown in FIG. 10(b). A light output waveform W4 (shown in FIG. 10(a)) that is required cannot be obtained.

Here, in the case in which a large overshoot is generated in a light signal transmitted in the optical communication, there is a method for detecting the peak of the overshoot at a circuit on a receiving end. In this case, a light receiving level is recognized at the peak, that is, the magnitude of the peaking current Ipeak is recognized as the level of the light, so that a malfunction occurs. Thus, in the case in which the overshoot of the light is large, a large error occurs in the light signal level, and deterioration of receiving sensitivity occurs.

SUMMARY OF THE INVENTION

The present invention was made in view of the above conventional problems, and an object of the present invention is to provide a light emitting diode driving device which can carry out high-speed driving by realizing faster rising and falling of a light output waveform and realizing the light output waveform having less overshoot by improving a response characteristic, etc. with respect to a temperature change, and an optical transmission device including the light emitting diode driving device.

In order to achieve the above object, a light emitting diode driving device of the present invention is a light emitting diode driving circuit for driving a light emitting diode, and the light emitting diode driving circuit includes: a driving current generating section for generating a driving current for the light emitting diode in accordance with a driving pulse signal supplied from outside; a peaking current generating section for generating a peaking current obtained by differentiating the driving pulse signal; and a peaking current control section for controlling a magnitude of the peaking current generated from the peaking current generating section. Moreover, a current that is equal to the sum of the driving current and the peaking current flows to the light emitting diode.

According to the above invention, the light emitting diode driving circuit is arranged such that (i) the driving current generated for the light emitting diode from the driving current generating section in accordance with the driving pulse signal supplied from outside and (ii) the peaking current generated from the peaking current generating section and obtained by differentiating the driving pulse signal are added, and the light emitting diode driving circuit includes the peaking current control section for controlling the magnitude of the peaking current generated from the peaking current generating section.

As a result, when the light emitting diode emits light, the peaking current, which is added when the light emitting diode emits light and does not emit light, is controlled so as not to excessively generate the overshoot in the light output waveform. Meanwhile, when the light emitting diode does not emit light, the peaking current is controlled so as not to excessively generate backshoot. With this, it is possible to appropriately discharge the electric charge from the parasitic capacitor of the light emitting diode, suppress excess reduction of the fall time in the light output waveform, and reduce the fall time to obtain the required fall time of the light output waveform.

In this way, it is possible to obtain the light output waveform of the light emitting diode, the light output waveform having fast rise time and fall time without generating the overshoot.

Therefore, it is possible to provide the light emitting diode driving device which realizes the high-speed driving by speeding up the rising and falling of the light output waveform, improving the response characteristic, etc. with respect to the temperature change and realizing the light output waveform having less overshoot.

In order to achieve the above object, an optical transmission device of the present invention is an optical transmission device including a light emitting diode driving circuit, and the light emitting diode driving circuit includes: a driving current generating section for generating a driving current for a light emitting diode in accordance with a driving pulse signal supplied from outside; a peaking current generating section for generating a peaking current obtained by differentiating the driving pulse signal, and a peaking current control section for controlling a magnitude of the peaking current generated from the peaking current generating section. Moreover, a current that is equal to the sum of the driving current and the peaking current flows to the light emitting diode, and the light emitting diode driving circuit is applicable to a driving circuit of a semiconductor light emitting element for an optical fiber communication, for a space light transmission communication or for a photocoupler signal transmission.

According to the above invention, it is possible to carry out the optical fiber communication, the space light transmission communication and the photocoupler signal transmission at low cost with a simple circuit configuration. In addition, it is possible to realize the light output waveform having the fast rising and falling and having less overshoot by improving the response characteristic, etc. with respect to the temperature change. In this way, it is possible to provide the optical transmission device including the light emitting diode driving device which can realize the high-speed driving.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 3($a$) is a circuit diagram showing a specific configuration of a temperature compensation circuit of the light emitting diode driving device.

FIG. 3($b$) is a circuit diagram showing a specific configuration of another temperature compensation circuit of the light emitting diode driving device.

FIG. 4($a$) is a waveform chart showing a voltage waveform of a peaking capacitor terminal in the case in which a peaking control is not carried out in the light emitting diode driving device.

FIG. 4($b$) is a waveform chart showing the voltage waveform of the peaking capacitor terminal in the case in which the peaking control is carried out in the light emitting diode driving device.

FIG. 6($a$) is a waveform chart showing the driving current Idriv, the peaking current Ipeak, the LED current Iled and the light output waveform of the LED in the case in which a phase compensation is not carried out in the light emitting diode driving device.

FIG. 6($b$) is a waveform chart showing the driving current Idriv, the peaking current Ipeak, the LED current Iled and the light output waveform of the LED in the case in which the phase compensation is carried out in the light emitting diode driving device.

FIG. 8($a$) is a circuit diagram showing a configuration of a phase compensation circuit of the light emitting diode driving device.

FIG. 8(b) is a circuit diagram showing another configuration of the phase compensation circuit of the light emitting diode driving device.

DESCRIPTION OF THE EMBODIMENTS

The following explains one embodiment of the present invention in reference to FIGS. 1 to 8. Note that a light emitting diode driving device of the present embodiment is applicable to an optical transmission device which uses the light emitting diode driving device as or as part of a driving circuit of a semiconductor light emitting element for an optical fiber communication, for a space light transmission communication or for a photocoupler signal transmission.

The optical transmission device of the present embodiment is a communication device which carries out a control signal transmission and a data transmission between devices, and is an optical transmission device which carries out the data transmission using light to electrically insulate the devices. The optical transmission device includes (i) a light emitting element which converts an electric signal into a light signal, (ii) a light emitting diode driving device, (iii) a light receiving element (not shown) which receives the light signal, and (iv) an amplifier (not shown) which converts the electric signal, generated in the receiving element, into the control signal for the devices.

Figure 1:
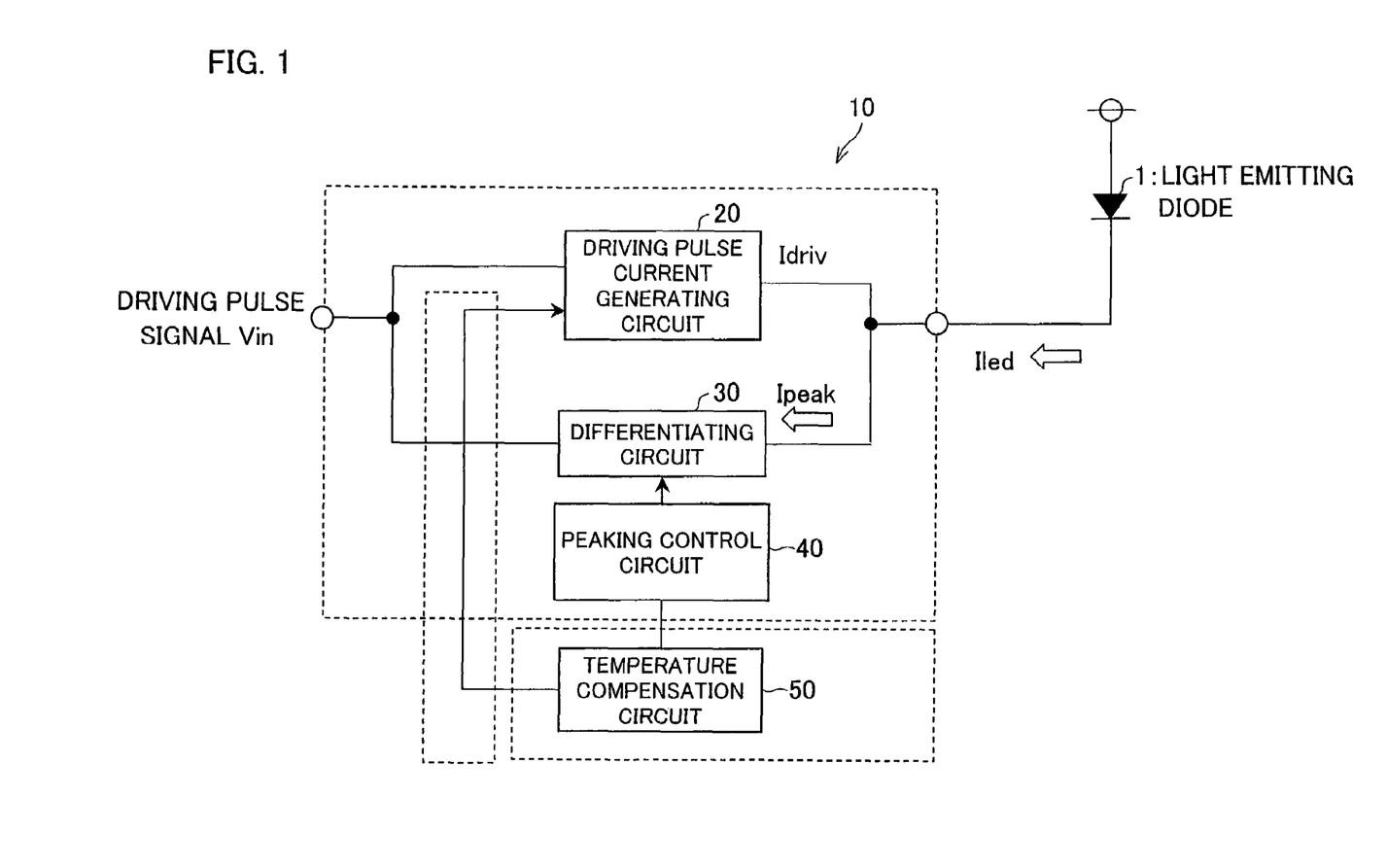
FIG. 1 shows one embodiment of a light emitting diode driving device of the present invention, and is a block diagram showing an equivalent circuit of the light emitting diode driving device.

As shown in FIG. 1, a light emitting diode driving device 10 in the optical transmission device of the present embodiment includes (i) a driving pulse current generating circuit 20 as driving current generating means for generating a driving current Idriv for a light emitting diode (hereinafter referred to as an "LED") 1 in accordance with a driving pulse signal Vin supplied from outside, (ii) a differentiating circuit 30 as peaking current generating means for generating a peaking current Ipeak obtained by differentiating the driving pulse signal Vin, and (iii) a peaking control circuit 40 as peaking current control means for controlling the magnitude of the peaking current Ipeak generated from the differentiating circuit 30.

Figure 2:
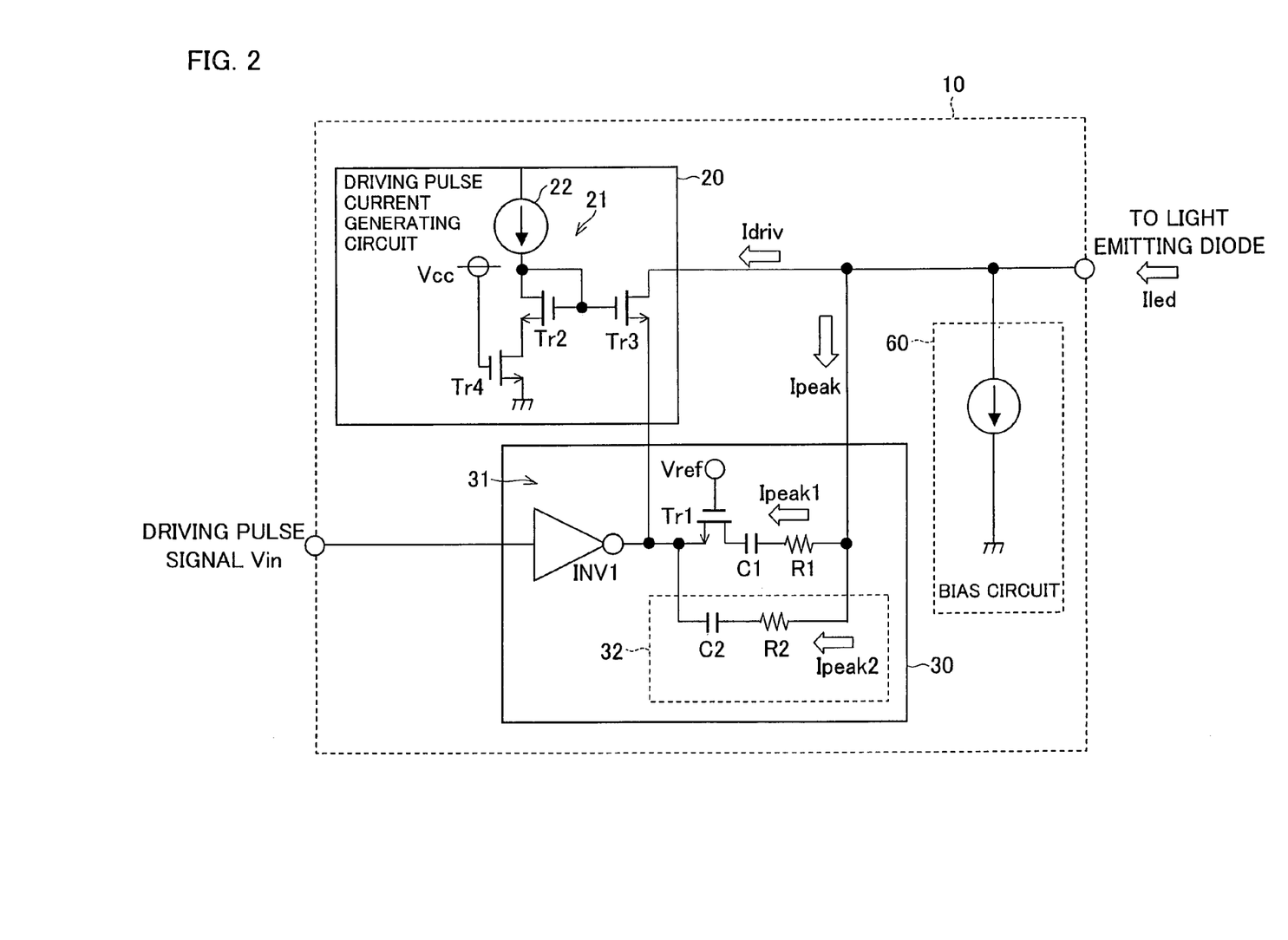
FIG. 2 is a circuit diagram showing a specific configuration of the light emitting diode driving device.

Specifically, as shown in FIG. 2, the driving pulse signal Vin is supplied to the driving pulse current generating circuit 20 and the differentiating circuit 30 through an inverter INV1. Then, a current Iled that is equal to the sum of the driving current Idriv and the peaking current Ipeak flows to the LED 1.

Moreover, in the present embodiment, a temperature compensation circuit 50 is provided for the peaking control circuit 40. The temperature compensation circuit 50 compensates a temperature change in the peaking current Ipeak or a temperature change in the driving current driv. In the present embodiment, the peaking control circuit 40 controls the magnitude of the peaking current Ipeak in accordance with the temperature change in the peaking current Ipeak changed in temperature by the temperature compensation circuit 50, or controls the magnitude of the driving current Idriv in accordance with the temperature change in the driving current Idriv changed in temperature by the temperature compensation circuit 50.

As shown in FIG. 1, in the light emitting diode driving device 10, the optimal peaking current Ipeak is generated by a control signal transmitted from the peaking control circuit 40 to the differentiating circuit 30. Thus, it is possible to optimize a light output waveform of the LED 1. Moreover, the control signal is transmitted from the temperature compensation circuit 50 to the peaking control circuit 40. Thus, it is possible to optimize the light output waveform of the LED 1 in accordance with the temperature change. Further, a signal is transmitted from the temperature compensation circuit 50 to the driving pulse current generating circuit 20 to control the amount of the driving current Idriv in accordance with the temperature characteristic of the efficiency of light emission of the LED 1. As a result, it is possible to keep a constant intensity of the light output, supply the control signal to the peaking control circuit 40 so as to generate the peaking current Ipeak corresponding to the constant intensity of the light output, keep a constant intensity of the light output, and obtain the required fast light output waveform.

The following explains a specific configuration of the light emitting diode driving device 10 in reference to FIG. 2.

As shown in FIG. 2, the driving pulse current generating circuit 20 includes a constant current circuit 21 and the inverter INV1 provided between the constant current circuit 21 and the LED 1 as switching means for carrying out ON-OFF control of the LED 1 in accordance with the driving pulse signal Vin.

Specifically, a constant current output 22, a drain and gate of a MOS transistor Tr2 and a gate of a MOS transistor Tr3 are connected with each other. Moreover, a source of the MOS transistor Tr2 is connected with a drain of a MOS transistor Tr4, a gate of the MOS transistor Tr4 is connected with a power source voltage Vcc, and a source of the MOS transistor is connected to ground. Further, a drain of the MOS transistor Tr3 is connected with an anode of the LED 1, and a source of the MOS transistor Tr3 is connected with an output terminal of the inverter INV1.

With this, a constant current flows to the LED 1 when an output of the inverter INV1 is low, and the constant current does not flow to the LED 1 when the output of the inverter INV1 is high.

That is, the inverter INV1 functions as a switch of the constant current circuit 21. When the output of the inverter INV1 is low, the source of the MOS transistor Tr3 is connected to ground, and the MOS transistors Tr2 and Tr3 operates as a current mirror circuit. Meanwhile, when the output of the inverter INV1 is high, the source of the MOS transistor Tr3 is connected with the power source voltage Vcc. Therefore, the MOS transistors Tr2 and Tr3 do not operate as the current mirror circuit, and the current does not flow to the LED 1.

The differentiating circuit 30 includes a first differentiating circuit 31 constituted by (i) a current limiting resistor R1 as a first resistor whose one end is connected with a cathode of the LED 1, (ii) a peaking capacitor C1 as a first capacitor whose one end is connected with another end of the current limiting resistor R1, (iii) the inverter INV1 as an inverter circuit to which the driving pulse signal Vin is supplied, and (iv) the MOS transistor Tr1 whose drain is connected with another end of the peaking capacitor C1, source is connected with the output terminal of the inverter INV1, and gate receives a control voltage for controlling the peaking current Ipeak. That is, the peaking current Ipeak is determined in accordance with the amplitude of the output of the inverter INV1, and the amount of the peaking current Ipeak is controlled in accordance with a gate voltage of the MOS transistor Tr1 that is an element for controlling the amplitude of the output of the inverter INV1.

Figure 3A:
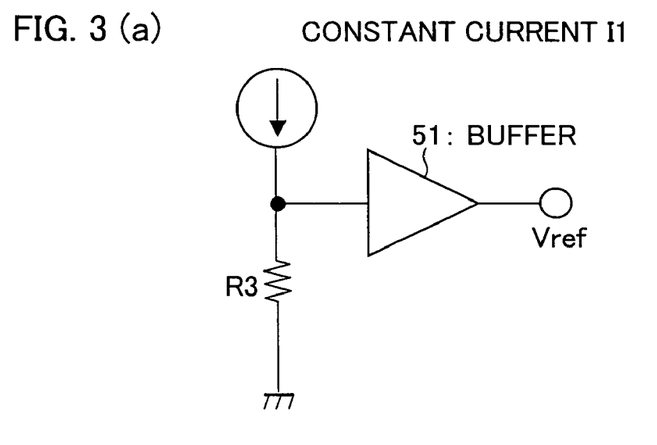

Further, as shown in FIG. 3(a), the temperature compensation circuit 50 can be constituted by, for example, a constant current I1 whose temperature characteristic is 0, a resistor R3 and a buffer 51. With this, a peaking control voltage Vref applied to the gate of the MOS transistor Tr1 can have the temperature characteristic of the resistor R3.

Figure 3B:
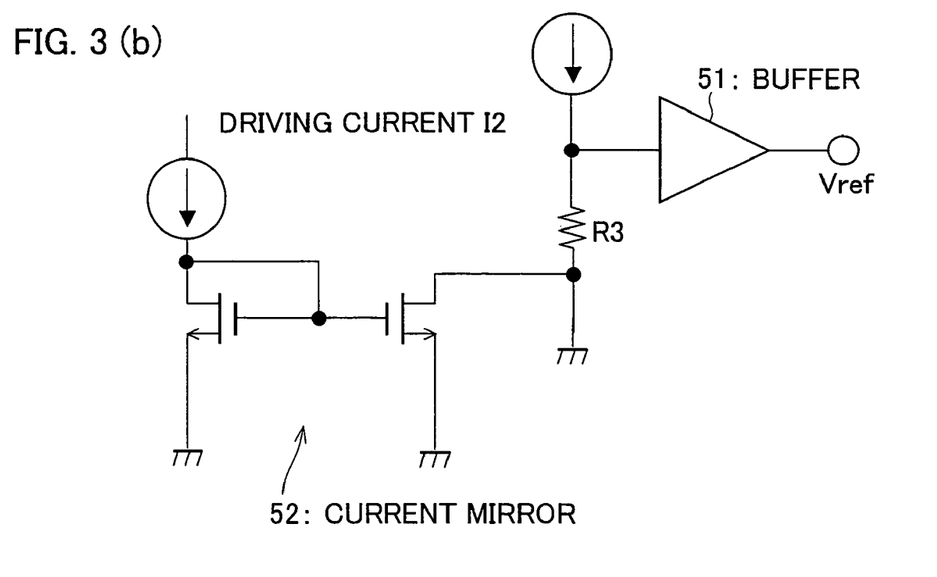
Figure 4:
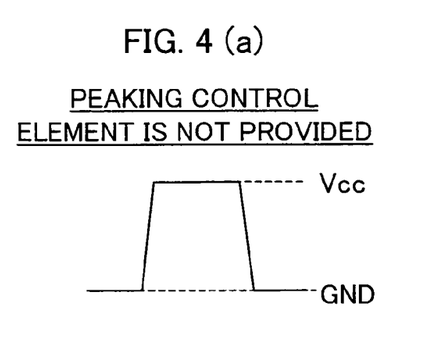

Moreover, for example, in the case of setting a driving current outside the temperature compensation circuit 50, it is possible to use a driving current I2 that is set, as shown in FIG. 3(b). That is, in the present embodiment, the amount of the temperature change in the peaking current Ipeak is set in accordance with the temperature change in the peaking control voltage Vref. Therefore, the peaking current Ipeak is controlled by setting the temperature characteristic of the peaking control voltage Vref to be an arbitrary fixed value.

The following explains operations carried out by the light emitting diode driving device 10.

As shown in FIG. 2, in the driving pulse current generating circuit 20 of the light emitting diode driving device 10, the driving pulse signal Vin that is a light emitting diode driving pulse is supplied from outside, and the driving current Idriv that is a current pulse is outputted. Moreover, in the first differentiating circuit 31, the driving pulse signal Vin that is an input pulse is differentiated to generate the peaking current Ipeak.

Then, the peaking current Ipeak and the driving current Idriv are added so as to generate an LED current Iled. Here, the peaking current Ipeak can be obtained by the following formula (A).

$$Ipeak \propto (Vref-Vth), C1, 1/tr \quad (A)$$

where Vth indicates a threshold voltage of the MOS transistor Tr.

In the present embodiment, as shown in FIGS. 4(a) and 4(b), by applying the peaking control voltage Vref to the gate of the MOS transistor Tr1, a peaking voltage applied to the peaking capacitor C1 is clamped at a voltage obtained by the following formula (1).

$$Vref-Vth \quad (1)$$

Moreover, "tr" in the above formula (A) is proportional to a time constant which is determined in accordance with the peaking capacitor C1, the current limiting resistor R1 and an ON resistance of the MOS transistor Tr1.

Thus, it is possible to obtain the LED current Iled.

The following explains temperature compensation and peaking current compensation with respect to a change in the driving current.

As shown by the above formula (1), the peaking current Ipeak is determined by the peaking control voltage Vref. Therefore, in the case in which the temperature characteristic of the peaking control voltage Vref is an arbitrary value, the peaking current Ipeak has the temperature characteristic of the peaking control voltage Vref–Vth. For example, as shown in FIG. 3(a), in the case of setting the peaking control voltage Vref by the constant current I1 whose temperature characteristic is 0 and the resistor R3, the peaking current Ipeak has the temperature characteristic that is the temperature characteristic of the resistor R3–Vth.

Moreover, as shown in FIG. 3(b), in the case of setting the driving current I2 outside the temperature compensation circuit 50, a current proportional to the driving current I2 and a current flowing to the resistor R3 by a current mirror 52 are added. Thus, it is possible to set the peaking control voltage Vref proportional to the driving current I2.

As a result, in the light emitting diode driving device 10 of the present embodiment, light outputs have respective temperature characteristics depending on the structure of the LED 101. Generally, the efficiency of light emission decreases at high temperature. On this account, it is necessary to obtain a constant light output by increasing the driving current Idriv. The method used in the present embodiment is a method for superimposing the peaking current Ipeak on the driving current Idriv. Therefore, in the case of largely increasing the driving current Idriv, it is necessary to proportionally increase the peaking current Ipeak. However, the conventional method cannot arbitrarily adjust the peaking current Ipeak in proportion to the driving current Idriv. On this account, when the driving current Idriv is changed, the peaking current Ipeak becomes short or excess, and the light output waveform becomes a light output waveform W5 shown in FIG. 10(b). A light output waveform W4 (shown in FIG. 10(a)) that is required cannot be obtained.

Figure 5:
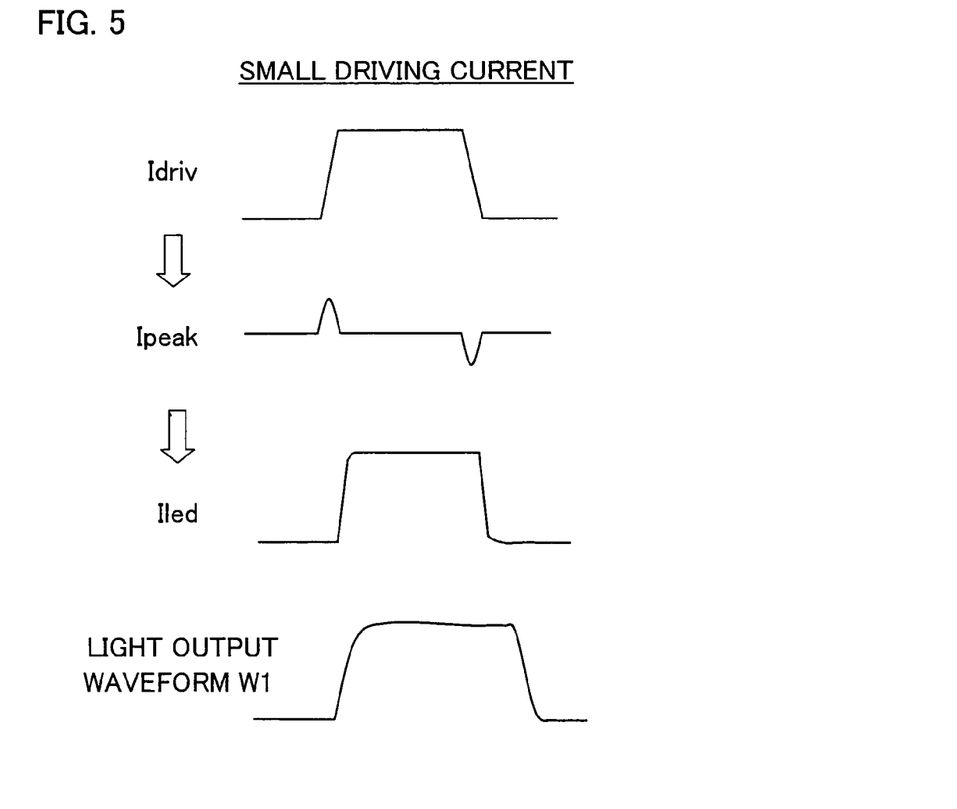
FIG. 5 is a waveform chart showing a driving current Idriv, a peaking current Ipeak, an LED current Iled and a light output waveform of an LED in the case in which a driving current is small in the light emitting diode driving device.

However, in the present embodiment, it is possible to arbitrarily adjust the peaking current Ipeak in proportion to the driving current Idriv. Therefore, even when the driving current Idriv is small as shown in FIG. 5, it is possible to appropriately set the peaking current Ipeak.

Incidentally, in the light emitting diode driving device 10, the threshold voltage Vth varies by substantially ±0.2 V due to a semiconductor manufacturing process. This causes variations of the peaking current Ipeak.

In order to prevent the variations of the peaking current Ipeak, it is possible to use, as the control voltage applied to the gate of the MOS transistor Tr1, a voltage obtained by level shifting the peaking control voltage Vref in advance by the threshold voltage Vth.

That is, the peaking control voltage Vref is expressed by the following formula (2).

$$Vref=Vref1+Vth \quad (2)$$

Thus, the threshold voltage Vth is omitted from the formula (A). In this way, it is possible to reduce the variations of the peaking current Ipeak.

Moreover, in the case in which the driving current Idriv becomes large in the light emitting diode driving device 10, it is necessary to increase the peaking current Ipeak in proportion to the driving current Idriv. In order to increase the peaking current Ipeak, it is necessary to increase the peaking capacitor C1. However, in the case in which the peaking capacitor C1 becomes excessively large, limitation of a rise time and fall time of the inverter INV1 is affected. Here, in the case of excessively increasing the peaking capacitor C1, it is necessary to reduce the current limiting resistor R1 and the ON resistance of the MOS transistor Tr1. For these reasons, an excess increase of the peaking capacitor C1 leads to an increase in size of the MOS transistor Tr1 for a peaking control, and it becomes difficult to increase the peaking current Ipeak.

Here, as shown in FIG. 2, the present embodiment can prepare a second differentiating circuit 32 which can control a variable range of the peaking current Ipeak. That is, the second differentiating circuit 32 is connected in parallel with the MOS transistor Tr1, the peaking capacitor C1 and the current limiting resistor R1 in the first differentiating circuit 31. The second differentiating circuit 32 includes (i) a peaking capacitor C2 as a second capacitor connected with the output terminal of the inverter INV1 and (ii) a current limiting resistor R2 as a second resistor whose one end is connected with the cathode of the LED 1 and another end is connected with the peaking capacitor C2.

In the second differentiating circuit 32, a constant peaking current Ipeak is determined by the time constant of the peaking capacitor C2 and the current limiting resistor R2, not including the ON resistance of the MOS transistor Tr1. With this, it is possible to obtain the LED current Iled with a required circuit configuration at low cost, without increasing the MOS transistor Tr1 beyond necessity.

Meanwhile, as described above, a phase difference arises between a peaking current Ipeak1 and a peaking current Ipeak2 which are generated from the first differentiating circuit 31 and the second differentiating circuit 32, respectively.

That is, the phase of the peaking current Ipeak2 delays since the peaking current Ipeak1 is generated by a circuit including the MOS transistor Tr1 for controlling the peaking current. Therefore, the phase difference arises between the peaking current Ipeak1 and the peaking current Ipeak2.

Figure 6A:
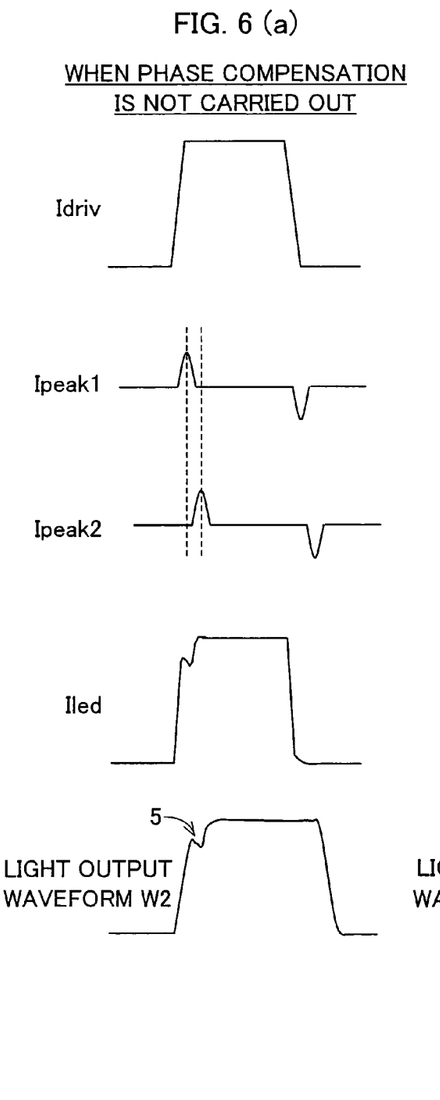
Figure 6B:
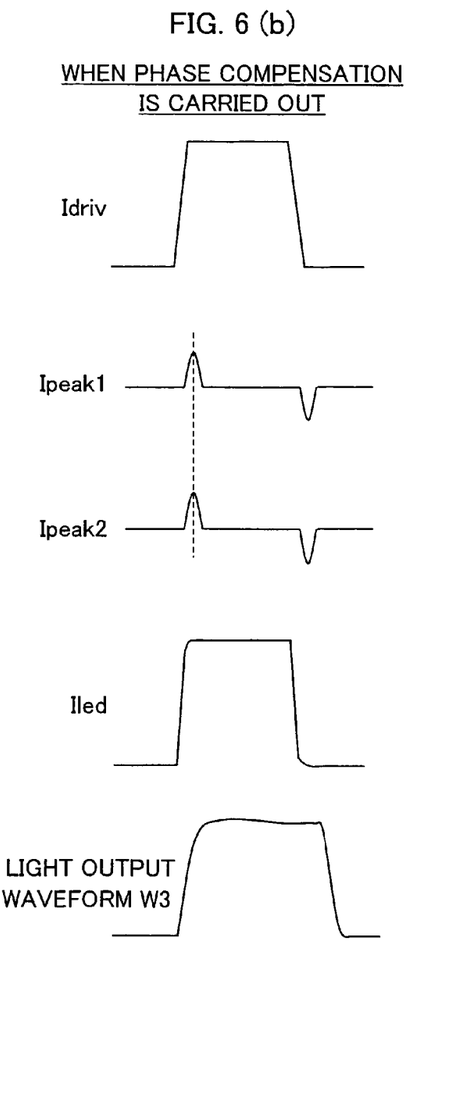

In the case in which the phase difference becomes large, a bump (projection) 5 is generated in the light output waveform W2, as shown in FIG. 6(a). The bump (projection) 5 may become a factor of malfunction depending on the size of the bump (projection) 5.

Figure 7:
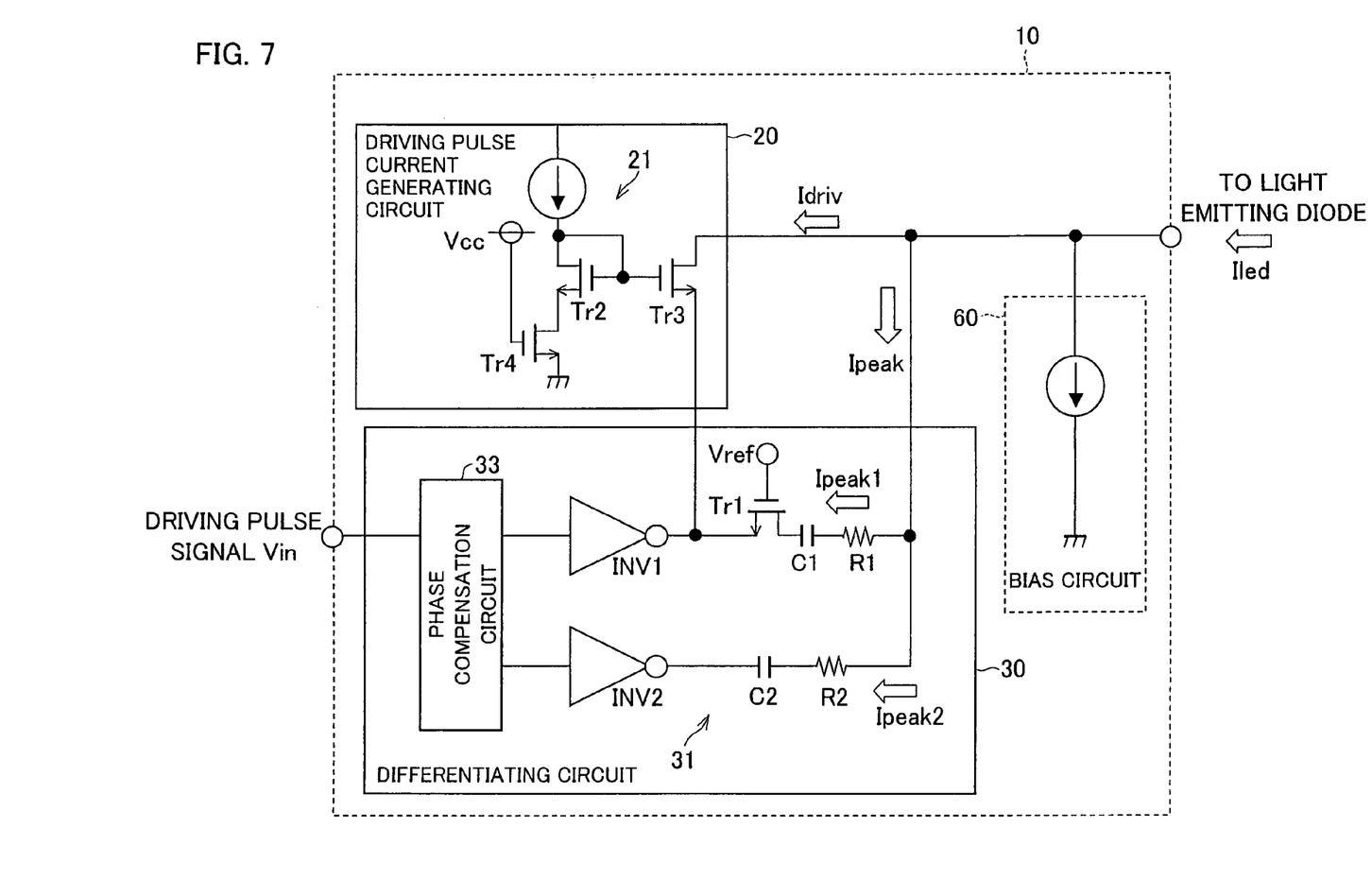
FIG. 7 is a circuit diagram showing another specific configuration of the light emitting diode driving device.
Figure 8:
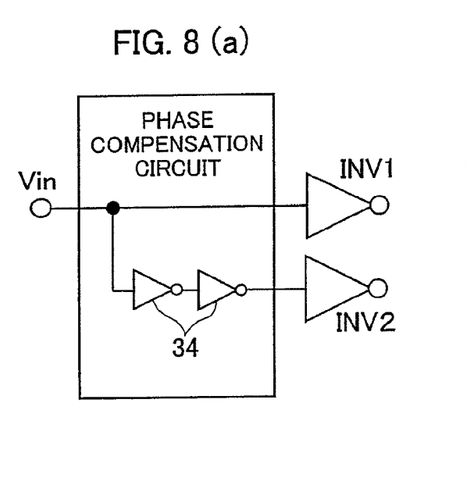

In the present embodiment, as shown in FIG. 7, it is possible to provide a phase compensation circuit 33 as phase adjusting means for setting the phase difference between the driving pulse signals Vin that are signal pulses supplied to the first differentiating circuit 31 and the second differentiating circuit 32, so as to match the phase of the peaking current Ipeak1 outputted from the first differentiating circuit 31 with the phase of the peaking current Ipeak2 outputted from the second differentiating circuit 32. In this case, in addition to the inverter INV1 as a first inverter circuit provided for the first differentiating circuit 31, it is necessary to provide an inverter INV2 as a second inverter circuit for the second differentiating circuit 32.

With this, it is possible to match the phase of a pulse of the peaking current Ipeak1 with the phase of a pulse of the peaking current Ipeak2. Therefore, as shown by a light output waveform W3 in FIG. 6(b), it is possible to optimize the light output waveform.

Note that the phase compensation circuit 33 can be arranged so that, for example, two inverters 34 are serially provided for the second differentiating circuit 32 as shown in FIG. 8(a) or a low pass filter 35 is provided for the second differentiating circuit 32 as shown in FIG. 8(b).

In the phase compensation circuit 33 shown in FIG. 8(a), the driving pulse signal Vin that is an input signal is directly supplied to the inverter INV1, however the driving pulse signal Vin is supplied to the inverter INV2 through two inverters 34 provided serially for generating time delay of several nanoseconds. In this way, it is possible to generate the phase difference between the signal inputted to the inverter INV1 and the signal inputted to the inverter INV2. Meanwhile, in the phase compensation circuit 33 shown in FIG. 8(b), instead of providing the inverters 34, a resistor is serially provided between the driving pulse signal Vin and the inverter INV2, and a capacitor is provided for an input of the inverter INV2. These constitute the low pass filter. Thus, it is possible to apply to the input of the inverter INV2, a signal whose phase delays.

Here, in the case in which the high-speed driving is required in the light emitting diode driving device 10 of the present embodiment, it is necessary to further increase the peaking capacitor C1 of the differentiating circuit 30. However, an excess increase of the peaking capacitor C1 leads to an increase in the time constant which determines the peaking current Ipeak. Therefore, it is impossible to increase the peaking current Ipeak.

In order to solve the above problem, it is possible to provide a bias circuit 60 as bias current output means for outputting a constant bias current as the driving current Idriv when the LED 1 is OFF.

The bias circuit 60 applies a current so that a constant extinction ratio can be kept when the LED 1 is OFF. In this way, it is possible to reduce a time it takes for switching the LED 1 from OFF to ON. Note that the extinction ratio is a ratio of the light intensity when the LED emits light (ON) to the light intensity when the LED does not emit light (OFF).

This method can be called a prebias method. By using the prebias method, it is possible to realize the high-speed driving of the LED 1 at low cost without increasing the peaking current Ipeak, that is, without increasing the peaking capacitor C1 beyond necessity. Note that the bias circuit 60 is applicable to a case in which the first differentiating circuit 31 and the second differentiating circuit 32 are provided, as shown in FIG. 7.

As explained above, in the present embodiment, the following requirements with respect to an output waveform of the optical transmission device can be satisfied simultaneously.

(A) An output waveform is adjustable to be a required fast waveform.

(B) The light emitting diode driving device which can satisfy the requirement (A) is realized at low cost.

Thus, the light emitting diode driving device 10 of the present embodiment is arranged such that (i) the driving current Idriv generated from the driving pulse current generating circuit 20 in accordance with the driving pulse signal Vin supplied from outside and (ii) the peaking current Ipeak generated from the differentiating circuit 30 and obtained by differentiating the driving pulse signal Vin are added, and the light emitting diode driving device 10 includes the peaking control circuit 40 for controlling the magnitude of the peaking current Ipeak generated from the differentiating circuit 30.

As a result, when the LED 1 emits light, the peaking current Ipeak, which is added when the LED emits light and does not emit light, is controlled so as not to excessively generate the overshoot in the light output waveform. Meanwhile, when the LED 1 does not emit light, the peaking current Ipeak is controlled so as not to excessively generate the backshoot. With this, it is possible to appropriately discharge the electric charge from the parasitic capacitor of the LED 1, suppress excess reduction of the fall time in the light output waveform, and reduce the fall time to obtain the required fall time of the light output waveform.

In this way, it is possible to obtain the light output waveform of the light emitting diode, the light output waveform having fast rise time and fall time without generating the overshoot.

Therefore, it is possible to provide the light emitting diode driving device 10 which realizes the high-speed driving by speeding up the rising and falling of the light output waveform, improving the response characteristic, etc. with respect to the temperature change and realizing the light output waveform having less overshoot.

Moreover, in the light emitting diode driving device 10 of the present embodiment, the peaking control circuit 40 controls the magnitude of the peaking current Ipeak in accordance with the temperature change in the peaking current Ipeak. On this account, it is possible to obtain the light output waveform having the fast rise time and fall time, without generating the overshoot in the light output waveform even if the temperature change occurs.

Moreover, in the light emitting diode driving device 10 of the present embodiment, the peaking control circuit 40 controls the magnitude of the peaking current Ipeak in accordance with the temperature change in the driving current Idriv. On this account, it is possible to set the driving current Idriv and the peaking current Ipeak matched with the temperature characteristic of the LED 1, not to generate the overshoot in the light output waveform which is constant in a wide range of temperatures, and to obtain the light output waveform having the fast rise time and fall time.

Moreover, in the light emitting diode driving device 10 of the present embodiment, the driving pulse current generating circuit 20 includes the constant current circuit 21 and the inverter INV1 provided between the constant current circuit 21 and the LED 1 to carry out ON-OFF control of the LED 1 in accordance with the driving pulse signal Vin. Moreover, the differentiating circuit 30 includes the first differentiating circuit 31 constituted by (i) the current limiting resistor R1 whose one end is connected with the cathode of the LED 1, (ii) the peaking capacitor C1 whose one end is connected with another end of the current limiting resistor R1, (iii) the inverter INV1 to which the driving pulse signal Vin is supplied, and (iv) the MOS transistor Tr1 whose drain is connected with another end of the peaking capacitor C1, source is connected with the output terminal of the inverter INV1, and gate receives the control voltage for controlling the peaking current Ipeak.

The amplitude of the peaking voltage is controlled in accordance with the voltage applied to the gate of the MOS transistor Tr1 which controls the peaking current Ipeak. In this way, it is possible to adjust the peaking current Ipeak easily. In addition, it is possible to optimize the peaking current Ipeak in accordance with the temperature change and a change in the driving current, not to generate the overshoot in the light output waveform which is constant in a wide range of temperatures, and to obtain the light output waveform having the fast rise time and fall time.

Incidentally, a value obtained by subtracting the threshold voltage Vth of the MOS transistor Tr1 from the peaking control voltage Vref applied to the gate of the MOS transistor Tr1 is proportional to the peaking current Ipeak.

In the present embodiment, because the ratio of the peaking current Ipeak to the driving current Idriv varies due to the variations, caused in the semiconductor manufacturing process, of the threshold voltage Vth, a voltage obtained by level shifting the peaking control voltage Vref by the threshold voltage is applied to the gate of the MOS transistor Tr1.

Thus, it is possible to generate the stable peaking current Ipeak in spite of the manufacturing variations.

Moreover, in the light emitting diode driving device 10 of the present embodiment, the second differentiating circuit 32 is connected in parallel with the first differentiating circuit 31. The second differentiating circuit 32 includes (i) the peaking capacitor C2 connected with the output terminal of the inverter INV1 and (ii) the current limiting resistor R2 whose one end is connected with the cathode of the LED 1 and another end is connected with the peaking capacitor C2.

In the case in which the driving current Idriv is large (for example, 20 mA), the peaking current Ipeak is large, and an adjustable range of the peaking current Ipeak is not enough for the driving current Idriv, the second differentiating circuit 32 controls a variable range and the first differentiating circuit 31 generates the peaking current Ipeak for the constant driving current Idriv. In this way, it is possible to reduce capacitance values of the differentiating circuits.

With this, it becomes unnecessary to reduce the ON resistance of the MOS transistor Tr1. Therefore, it is possible to realize, at low cost, the light emitting diode driving device 10 which can provide the light output waveform having the fast rise time and fall time, without generating the overshoot in the light output waveform.

Incidentally, in the case in which the first differentiating circuit 31 and the second differentiating circuit 32 are provided in parallel, the MOS transistor Tr1 for the peaking control is provided in the first differentiating circuit 31. Therefore, in the case in which the peaking current Ipeak1 and the peaking current Ipeak2 are different in phase, the bump (projection) 5 is generated in the light output waveform of the LED 1.

Here, in the present embodiment, in order to adjust the phase of an inverter output and not to generate the bump (projection) 5, the phase compensation circuit 33 is provided before the inverter INV1 of the first differentiating circuit 31 and the inverter INV2 of the second differentiating circuit 32 to match the phase of the peaking current Ipeak1 outputted from the first differentiating circuit 31 with the phase of the peaking current Ipeak2 outputted from the second differentiating circuit 32.

As a result, it is possible to obtain the light output waveform having no bump (projection) 5 by providing the phase compensation circuit 33 for adjusting timings.

Moreover, the light emitting diode driving device 10 of the present embodiment includes the bias circuit 60 which outputs the constant bias current as the driving current Idriv when the LED 1 is OFF.

That is, by providing the bias circuit 60 that is a prebias circuit for increasing the response speed of the LED 1 and applying minimal current when the LED is OFF, it is possible to provide the light emitting diode driving device 10 which can reduce a time it takes for starting light emission and carry out the quick response.

Moreover, the optical transmission device of the present embodiment includes the light emitting diode driving device 10, and the light emitting diode driving device 10 is applicable to a driving device of a semiconductor light emitting element for the optical fiber communication, for the space light transmission communication or for the photocoupler signal transmission.

As a result, it is possible to carry out the optical fiber communication, the space light transmission communication and the photocoupler signal transmission at low cost with a simple circuit configuration. In addition, it is possible to realize the light output waveform having the fast rising and falling and having less overshoot by improving the response characteristic, etc. with respect to the temperature change. In this way, it is possible to provide the optical transmission device including the light emitting diode driving device 10 which can realize the high-speed driving.

As above, in the light emitting diode driving device of the present embodiment, the peaking current control section controls the magnitude of the peaking current in accordance with a temperature change in the peaking current.

According to the above description, the peaking current control section controls the magnitude of the peaking current in accordance with the temperature change. in the peaking current. On this account, it is possible to obtain the light output waveform having the fast rise time and fall time, without generating the overshoot in the light output waveform even if the temperature change occurs.

In addition to the above-described light emitting diode driving device, in the light emitting diode driving device of the present embodiment, the peaking current control section may control the magnitude of the peaking current in accordance with a temperature change in the driving current.

According to the above description, the peaking current control section controls the magnitude of the peaking current in accordance with the temperature change in the driving current. On this account, it is possible to set the driving current and the peaking current matched with the temperature characteristic of the light emitting diode, not to generate the overshoot in the light output waveform which is constant in a wide range of temperatures, and to obtain the light output waveform having the fast rise time and fall time.

Moreover, in addition to the above-described light emitting diode driving device, the light emitting diode driving device of the present embodiment may be arranged such that the driving current generating section includes: a constant current circuit; and a switching section provided between the constant current circuit and the light emitting diode, for carrying out ON-OFF control of the light emitting diode in accordance with the driving pulse signal, and the peaking current generating section includes a first differentiating circuit constituted by: a first resistor whose one end is connected with a cathode of the light emitting diode; a first capacitor whose one end is connected with another end of the first resistor; an inverter circuit to which the driving pulse signal is inputted; and a MOS transistor whose drain, is connected with another end of the first capacitor, source is connected with an output terminal of the inverter circuit, and gate receives a control voltage for controlling the peaking current.

According to the above description, the driving current generating section includes the constant current circuit and a switching section provided between the constant current circuit and the light emitting diode to carry out ON-OFF control of the light emitting diode in accordance with the driving pulse signal. Moreover, the peaking current generating section includes the first differentiating circuit constituted by (i) the first resistor whose one end is connected with the cathode of the light emitting diode, (ii) the first capacitor whose one end is connected with another end of the first resistor, (iii) the inverter circuit to which the driving pulse signal is supplied, and (iv) the MOS transistor whose drain is connected with another end of the first capacitor, source is connected with the output terminal of the inverter circuit, and gate receives the control voltage for controlling the peaking current.

The amplitude of the peaking voltage is controlled in accordance with the voltage applied to the gate of the MOS transistor which controls the peaking current. In this way, it is possible to adjust the peaking current easily. In addition, it is possible to optimize the peaking current in accordance with the temperature change and a change in the driving current, not to generate the overshoot in the light output waveform which is constant in a wide range of temperatures, and to obtain the light output waveform having the fast rise time and fall time.

In addition to the above-described light emitting diode driving device, the light emitting diode driving device of the present embodiment may be arranged such that the control voltage applied to the gate of the MOS transistor is a voltage obtained by level shifting a peaking control voltage by a threshold voltage.

That is, a value obtained by subtracting the threshold voltage of the MOS transistor from the control voltage applied to the gate of the MOS transistor is proportional to the peaking current.

On this account, in the present embodiment, because the ratio of the peaking current and the driving current varies due to the variations, caused in the semiconductor manufacturing process, of the threshold voltage, a voltage obtained by level shifting the control voltage by the threshold voltage is applied to the gate of the MOS transistor.

Thus, it is possible to generate the stable peaking current in spite of the manufacturing variations.

Moreover, in addition to the above-described light emitting diode driving device, the light emitting diode driving device of the present embodiment may be arranged such that a second differentiating circuit is connected in parallel with the MOS transistor, the first capacitor and the first resistor of the first differentiating circuit; and the second differentiating circuit includes: a second capacitor connected with the output terminal of the inverter circuit; and a second resistor whose one end is connected with the cathode of the light emitting diode and another end is connected with the second capacitor.

According to the above description, the second differentiating circuit is connected in parallel with the first differentiating circuit. The second differentiating circuit includes (i) the second capacitor connected with the output terminal of the inverter circuit and (ii) the second resistor whose one end is connected with the cathode of the light emitting diode and another end is connected with the second capacitor.

In the case in which the driving current is large (for example, 20 mA), the peaking current is large, and an adjustable range of the peaking current is not enough for the driving current, the second differentiating circuit 32 controls a variable range and the first differentiating circuit 31 generates the peaking current for the constant driving current. In this way, it is possible to reduce capacitance values of the differentiating circuits.

With this, it becomes unnecessary to reduce the ON resistance of the MOS transistor. Therefore, it is possible to realize, at low cost, the light emitting diode driving device which can provide the light output waveform having the fast rise time and fall time, without generating the overshoot in the light output waveform.

In addition to the above-described light emitting diode driving device, the light emitting diode driving device of the present embodiment is arranged such that the inverter circuit includes a first inverter circuit provided for the first differentiating circuit and a second inverter circuit provided for the second differentiating circuit; and a phase adjusting section is provided before the first inverter circuit of the first differentiating circuit and the second inverter circuit of the second differentiating circuit, for matching a phase of the peaking current outputted from the first differentiating circuit with a phase of the peaking current outputted from the second differentiating circuit.

In the case in which the first differentiating circuit and the second differentiating circuit are provided in parallel, the MOS transistor for the peaking control is provided in the first differentiating circuit. Therefore, in the case in which the peaking current outputted from the first differentiating circuit and the peaking current outputted from the second differentiating circuit are different in phase, the bump (projection) is generated in the light output waveform of the light emitting diode.

Here, in the present embodiment, in order to adjust the phase of an inverter output and not to generate the projection, the phase compensation section is provided before the first inverter circuit of the first differentiating circuit and the second inverter circuit of the second differentiating circuit to match the phase of the peaking current outputted from the first differentiating circuit with the phase of the peaking current outputted from the second differentiating circuit.

As a result, it is possible to obtain the light output waveform having no bump (projection) by providing the phase compensation section for adjusting timings.

Moreover, in addition to the light emitting diode driving device, the light emitting diode driving device of the present embodiment may include a bias current output section for outputting a constant bias current as a driving current when the light emitting diode is OFF.

According to the above description, the light emitting diode driving device includes the bias current output section. which outputs the constant bias current as the driving current when the light emitting diode is OFF. That is, by providing the bias current output section that is a prebias circuit for increasing the response speed of the light emitting diode and applying minimal current when the light emitting diode is OFF, it is possible to provide the light emitting diode driving device which can reduce a time it takes for starting light emission and carry out the quick response.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A light emitting diode driving circuit for driving a light emitting diode, comprising:
    a driving current generating circuit generating a driving current for the light emitting diode in accordance with a driving pulse signal supplied from outside;
    a peaking current generating circuit generating a peaking current obtained by differentiating the driving pulse signal; and
    a peaking current control circuit controlling a magnitude of the peaking current generated from the peaking current generating circuit,
    a current that is equal to a sum of the driving current and the peaking current flowing to the light emitting diode, wherein:
    the driving current generating circuit includes:
    a constant current circuit; and
    a switching circuit provided between the constant current circuit and the light emitting diode, for carrying out ON-OFF control of the light emitting diode in accordance with the driving pulse signal, and
    the peaking current generating circuit includes a first differentiating circuit, wherein the first differentiating circuit comprises:
    a first resistor whose one end is connected with a cathode of the light emitting diode;
    a first capacitor whose one end is connected with another end of the first resistor;
    an inverter circuit to which the driving pulse signal is inputted; and
    a MOS transistor whose drain is connected with another end of the first capacitor, source is connected with an output terminal of the inverter circuit, and gate receives a control voltage for controlling the peaking current.

2. The light emitting diode driving circuit as set forth in claim 1, wherein the peaking current control circuit controls the magnitude of the peaking current in accordance with a temperature change in the peaking current.

3. The light emitting diode driving circuit as set forth in claim 1, wherein the peaking current control circuit controls the magnitude of the peaking current in accordance with a temperature change in the driving current.

4. The light emitting diode driving circuit as set forth in claim 1, wherein the control voltage applied to the gate of the MOS transistor is a voltage obtained by level shifting a peaking control voltage by a threshold voltage.

5. The light emitting diode driving circuit as set forth in claim 4, wherein the peaking control voltage has a temperature characteristic of a fixed value.

6. The light emitting diode driving circuit as set forth in claim 1, wherein
    a second differentiating circuit is connected in parallel with the MOS transistor, the first capacitor and the first resistor of the first differentiating circuit; and
    the second differentiating circuit includes:
    a second capacitor connected with an output terminal of the inverter circuit; and
    a second resistor whose one end is connected with the cathode of the light emitting diode and another end is connected with the second capacitor.

7. The light emitting diode driving circuit as set forth in claim 6, wherein:
    the inverter circuit includes a first inverter circuit provided for the first differentiating circuit and a second inverter circuit provided for the second differentiating circuit; and
    a phase adjusting circuit is provided before the first inverter circuit of the first differentiating circuit and the second inverter circuit of the second differentiating circuit, for matching a phase of the peaking current outputted from the first differentiating circuit with a phase of the peaking current outputted from the second differentiating circuit.

8. The light emitting diode driving circuit as set forth in claim 1, further comprising a bias current output circuit outputting a constant bias current as a driving current when the light emitting diode is OFF.

9. An optical transmission device comprising a light emitting diode driving circuit,
    the light emitting diode driving circuit including:
    a driving current generating circuit generating a driving current for a light emitting diode in accordance with a driving pulse signal supplied from outside;
    a peaking current generating circuit generating a peaking current obtained by differentiating the driving pulse signal, and
    a peaking current control circuit controlling a magnitude of the peaking current generated from the peaking current generating circuit,
    a current that is equal to a sum of the driving current and the peaking current flowing to the light emitting diode, and
    the light emitting diode driving circuit being applicable to a driving circuit of a semiconductor light emitting element for an optical fiber communication, for a space light transmission communication or for a photocoupler signal transmission, wherein the driving current generating circuit of the light emitting diode driving circuit includes:

a constant current circuit; and a switching circuit provided between the constant current circuit and the light emitting diode, for carrying out ON-OFF control of the light emitting diode in accordance with the driving pulse signal, and the peaking current generating circuit of the light emitting diode driving circuit includes a first differentiating circuit, wherein the first differentiating circuit comprises:

a first resistor whose one end is connected with a cathode of the light emitting diode;

a first capacitor whose one end is connected with another end of the first resistor;

an inverter circuit to which the driving pulse signal is inputted; and a MOS transistor whose drain is connected with another end of the first capacitor, source is connected with an output terminal of the inverter circuit, and gate receives a control voltage for controlling the peaking current.

10. The optical transmission device as set forth in claim 9, wherein the peaking current control circuit of the light emitting diode driving circuit controls a magnitude of the peaking current in accordance with a temperature change in the peaking current.

11. The optical transmission device as set forth in claim 9, wherein the peaking current control circuit of the light emitting diode driving circuit controls a magnitude of the peaking current in accordance with a temperature change in the driving current.

12. The optical transmission device as set forth in claim 9, wherein the light emitting diode driving circuit includes a bias current output circuit outputting a constant bias current as a driving current when the light emitting diode is OFF.

* * * * *